United States Patent
Sato et al.

[11] Patent Number: 5,946,977
[45] Date of Patent: *Sep. 7, 1999

[54] COLLAPSIBLE STEERING COLUMN

[75] Inventors: Sigeru Sato; Koji Seo; Yoshiaki Senoo, all of Ibara, Japan

[73] Assignee: Katayama Kogyo Co., Ltd., Ibara, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/758,632

[22] Filed: Nov. 27, 1996

[30] Foreign Application Priority Data

Nov. 28, 1995 [JP] Japan ................................ 7-334157

[51] Int. Cl.$^6$ ................................ B62D 1/19; B62D 1/20
[52] U.S. Cl. ............................ 74/492; 280/777; 464/134; 403/279; 403/281
[58] Field of Search ......................... 74/492; 403/279, 403/281, 282, 274, 337, 278, 277, 283; 180/78; 411/500, 501, 502, 503, 504, 505, 506; 188/371; 280/777, 779; 464/179, 183, 134, 113, 112, 132, 905

[56] References Cited

U.S. PATENT DOCUMENTS

| 3,434,367 | 3/1969 | Renneker et al. | 74/492 |
|---|---|---|---|
| 3,482,653 | 12/1969 | Maki et al. | 74/492 X |
| 3,717,046 | 2/1973 | Takao et al. | 74/492 |
| 3,864,988 | 2/1975 | Adams, III | 74/492 |
| 4,183,258 | 1/1980 | Stephan | 74/492 |
| 4,274,299 | 6/1981 | Jones | 74/492 |
| 4,301,959 | 11/1981 | Benteler et al. | |
| 4,304,147 | 12/1981 | Linnemeier et al. | |
| 4,325,174 | 4/1982 | Smith et al. | 464/181 X |
| 4,365,488 | 12/1982 | Mochida et al. | 464/134 X |
| 4,512,209 | 4/1985 | Linnemeier | 74/492 |
| 4,681,556 | 7/1987 | Palmer | 464/134 X |
| 4,836,705 | 6/1989 | La Barge et al. | 403/282 |
| 5,090,834 | 2/1992 | Yamamoto | 403/277 |
| 5,366,413 | 11/1994 | Yamaguchi et al. | 74/492 X |
| 5,404,630 | 4/1995 | Wu | 403/282 X |
| 5,498,096 | 3/1996 | Johnson | 403/283 X |
| 5,503,431 | 4/1996 | Yamamoto | 74/493 X |

FOREIGN PATENT DOCUMENTS 728797 7/1932 France ................... 411/502

Primary Examiner—Charles A Marmor
Assistant Examiner—Scott Lund
Attorney, Agent, or Firm—Pillsbury Madison & Sutro LLP

[57] ABSTRACT

A collapsible steering column includes a bellows tube with a corrugated portion in which the radius varies regularly along the length of the tube. A connective portion is located at both ends of the bellows tube, and transfer portions are located between each of the connective portions and the corrugated portion. By inserting a reinforcement into the end portion of the bellows tube, the strength and rigidity of the connective portion increases. Press forming, stamp forming, rivet forming, and/or adhesive methods are applied to connect the end portion of the bellows tube and the reinforcement.

6 Claims, 11 Drawing Sheets

COLLAPSIBLE STEERING COLUMN

This application is based on and claims priority from Japanese patent application No. Hei 7-334157 filed Nov. 28, 1995, the content of which is incorporated by reference.

BACKGROUND OF THE INVENTION

1. Field of the Invention

This invention relates to a steering shaft for a steering wheel in automotive vehicles. More particularly, this invention is a new steering column and a new method of making the steering column. When an accident involving a motor vehicle occurs, the impact energy is absorbed by plastic deformation of a portion of this collapsible steering shaft.

2. Description of Related Art

As shown in FIG. 11, current collapsible steering shafts with energy absorption mechanisms include generally a corrugated part 10 which varies from larger radius tube 110 to smaller radius tube 190. Yoke 20 and flange 30 play roles as connective parts on both ends 150 of the corrugated tube 10. The corrugated tube's ends 150, and the end portion 250 of the yoke 20 and the flange 30 are joined by welding 50. The corrugated tube 10 is a thin-walled pipe of varying diameter, while the yoke 20 and the flange 30 are made by forging and are of higher rigidity material. As these parts are connected by welding, the strength and rigidity of the joined parts exists discontinuously in the longitudinal direction. This discontinuity causes inefficient absorption of impact energy.

Accordingly, and as a preliminary step in the conception of this invention, forming the corrugated part 10 and the connective parts 20 and 30 from a single material by integral-type forming was considered. As shown in FIG. 10, for example, the tube 100, consisting of the corrugated portion and its two connective ends 200, are formed integrally. Tube 100 is formed continuously by bulge forming and other plastic forming. By using plastic forming, the flow of materials is continuous longitudinally along the part, and the energy absorption performance required of the part is achieved. However, a significant disadvantage of this design is cost. The use of plastic forming of both the corrugated portion and the connective end portions requires adoption of high-grade materials. As a result, the higher cost of materials becomes a serious problem.

OBJECT AND SUMMARY OF THE INVENTION

This invention solves the above-mentioned cost problem by applying high-grade material only to those portions of the steering column where it is required (the corrugated portion), while using lower-grade material to other portions of the device. The issue of discontinuity of strength and rigidity in the longitudinal direction is addressed by manufacturing the parts by plastic forming such as press forming, stamp forming, or riveting.

SUMMARY OF THE INVENTION

Specifically, this invention relates to a portion of a steering shaft which absorbs impact energy in automotive accidents. It includes a corrugated tube of regularly varying radius, with integrally-formed reinforcements at the ends of the corrugated tube. The reinforcements are connected to the corrugated tube by press forming, stamp forming, riveting or adhesive.

This collapsible portion of the steering column is located intermediately along the full length of the steering shaft, and is deformed plastically in the axial direction or in bending when an impact force is applied to it from the steering wheel and/or from the gear box. Deformation occurs progressively as thin-wall buckling of the corrugated portion occurs to each convolution of the tube, one-by-one. The plastic-buckling deformation efficiently absorbs the impact force (impact energy) applied from the steering wheel and/or the gear box.

Additionally, in this invention, the connective portion includes both the thin-walled tube and the thick-walled reinforcement. Overall, the cost of materials is reduced: the higher grade material is adopted for the corrugated tube, and the lower grade material is adopted for the reinforcements. By this more efficient distribution of materials, the total cost of this system is reduced.

Furthermore, to enhance the strength and rigidity of the collapsible steering shaft, the currently-used type would require an increase in the thickness of the corrugated tube's connective ends 150. That would require either increasing the thickness of the entire tube wall, or portions of the tube wall, or using higher-grade materials for the entire piece, both of which are costly options. With this invention, however, adjustments to the strength and rigidity can be achieved by targeting changes directly to the reinforcements individually, without necessitating costly changes to the thin-walled corrugated portion.

The reinforcements are installed into the ends of the corrugated tube by press or stamp forming, riveting, or adhesive. All of these connection methods represent an improvement in efficiency relative to the welding which is used to connect parts in current collapsible steering column designs.

BRIEF DESCRIPTION OF THE DRAWINGS

This invention, as well as its many advantages, may be further understood by reference to the following drawings. These drawings include illustrations of three of the possible methods for connecting the parts involved in this invention: bulge forming, staking forming, and riveting. In the various figures, like parts are referred to by like numbers.

DETAILED DESCRIPTION OF PREFERRED EMBODIMENTS

Figure 1:
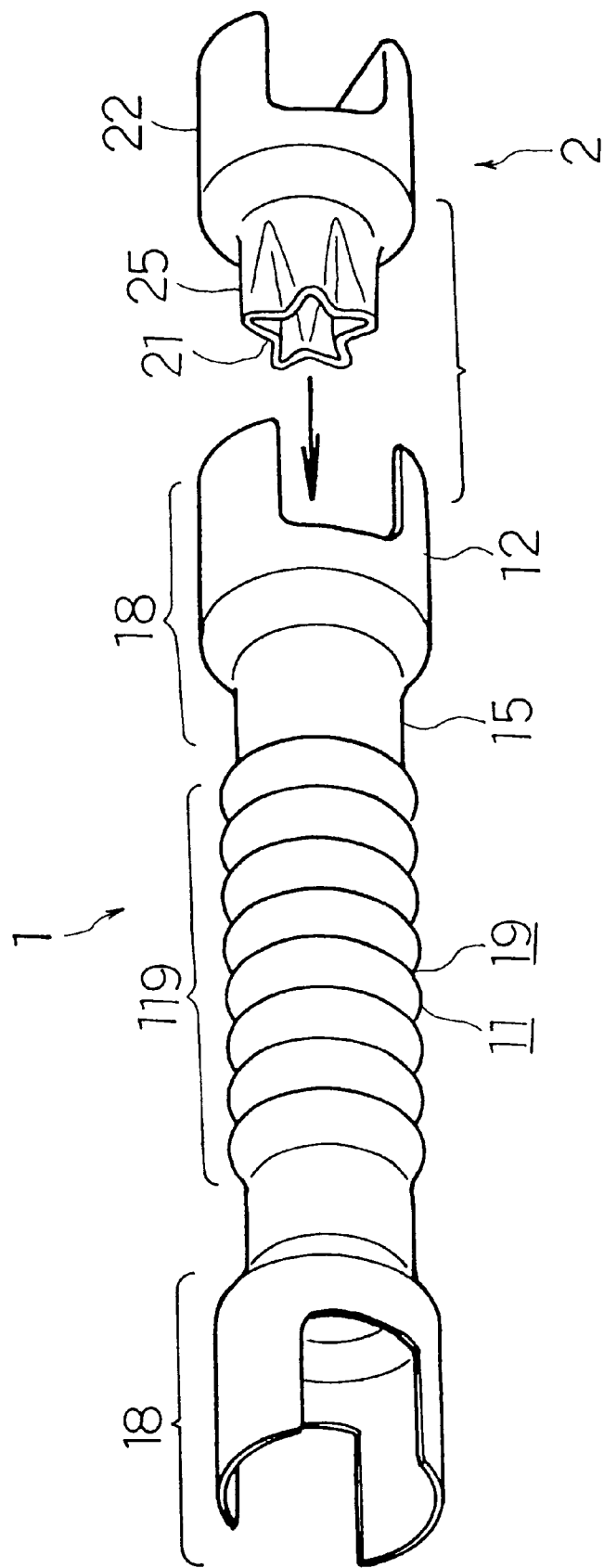
FIG. 1 is an oblique view showing the relationship between the corrugated tube and a reinforcement, which is the basic configuration of this invention.

The invention may be further understood by reference to the following detailed description.

Embodiments of this invention are shown in FIGS. 1 through 9.

A structure according to this invention includes a corrugated tube 119 with a radius that varies regularly to form convolutions along the length of the tube, with a smaller radius 19 and a larger radius 11. The corrugated tube's two ends 18 are continuations of the corrugated tube 119 itself. Furthermore, the structure includes a bellows tube 1 which has a connective structure 12 at the end of tube 18, and a reinforcement 2, which connects integratively with the bellows tube.

In the basic configuration, the bellows tube 1 includes the corrugated portion 119 which is a thin-walled pipe shaped by press forming and/or spinning forming, and the connective portion 12, which is shaped by plastic forming, at both ends of the corrugated portion 119. The transfer portion 15 is a constant-radius segment between the ends of the corrugated portion 119 and the connective portions 12, which is to be paired with the connective portion 25 of the reinforcement 2. As the bellows tube 1 has the corrugated part 119 with a varying radius, the larger and smaller radius portions deform plastically upon input of impact energy. For this reason, the bellows tube is required to exhibit moderate plasticity and absorption of impact energy. Accordingly, higher grade materials are used for this part.

Figure 3:
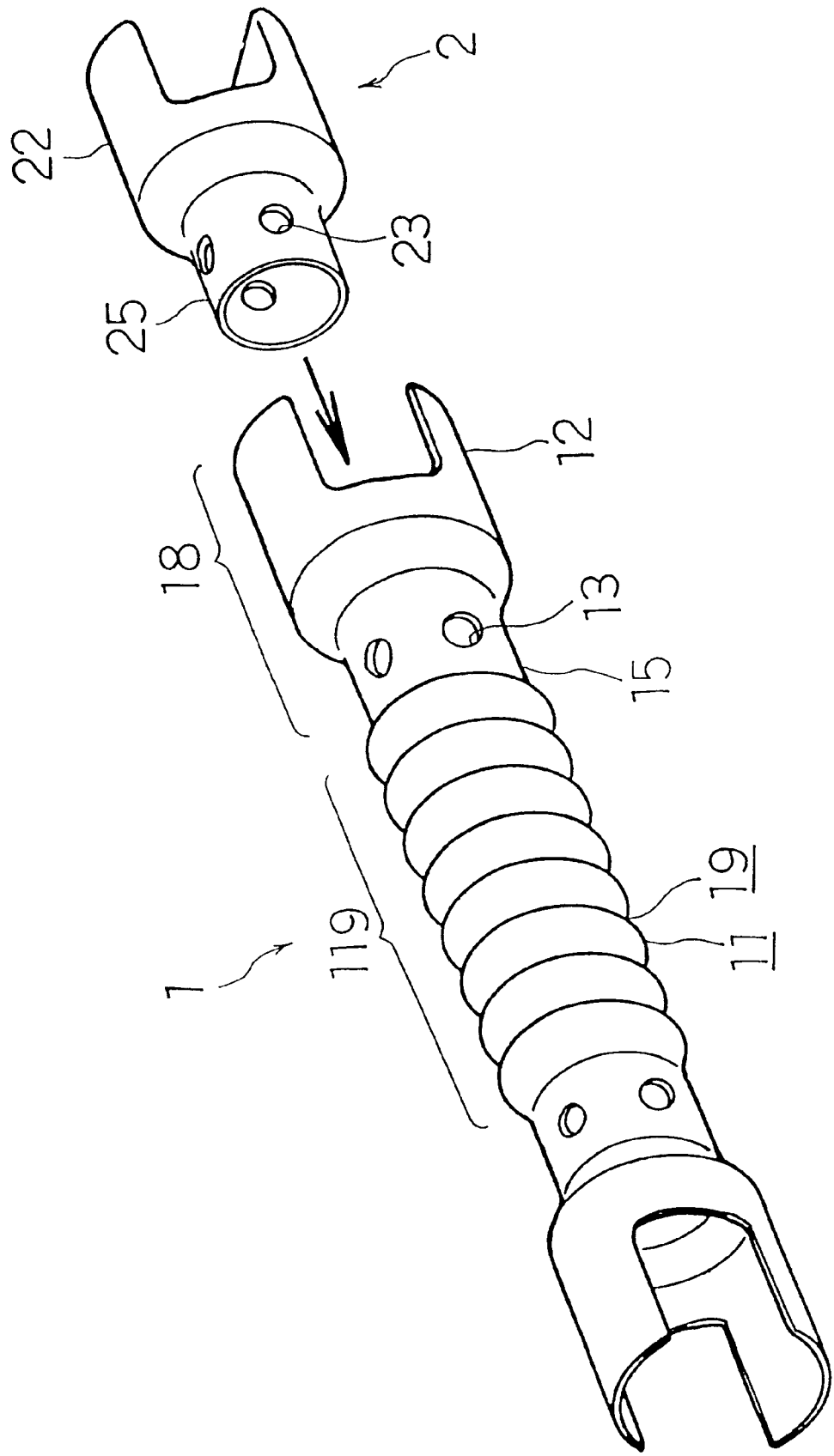
FIG. 3 is an oblique view showing the relationship between the corrugated tube and a reinforcement, which is the basic configuration of this invention.

The reinforcement 2, which is inserted into both ends 18 of bellows tube 1, is formed with thicker wall pipe materials. As shown in FIG. 1, its basic structure includes a connective portion 22 similar to the connective portion 12 of the bellows tube 1. The reinforcement 2 is required to have higher strength and rigidity than the bellows tube 1. Accordingly, the reinforcement 2 does not require the higher grader materials necessary for the bellows tube 1, and thus cheaper and lower-grade materials are applied to the reinforcement 2. The connective portion 25, is made with crimps as shown in FIG. 1, or with holes in the connective portion as shown in FIG. 3. These crimps or holes are used in connecting with the transfer portion 15 of the bellows tube 1.

The relationship between the transfer portion 15 of the bellows tube 1 and the connective portion 25 of the reinforcement 2 is explained herein.

Figure 2:
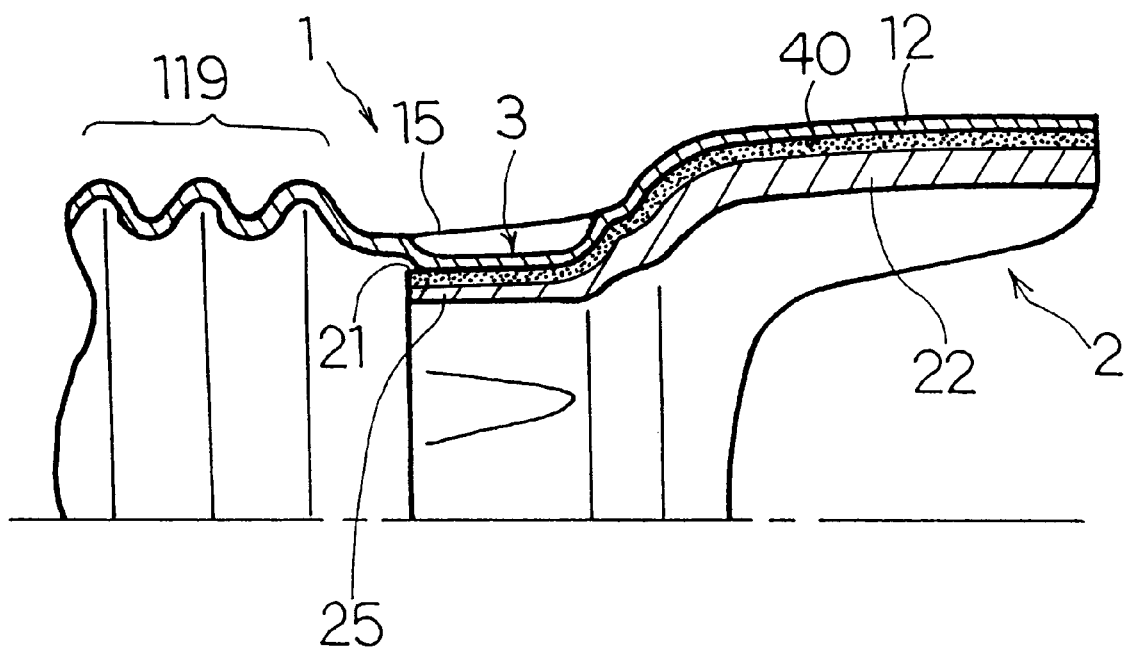
FIG. 2 is a partial longitudinal section of the steering column of FIG. 1 after the reinforcement 2 has been installed into the thin-walled tube 1 by press forming.

The methods of connection are now explained with reference to FIGS. 1 and 2. The indentations 21 with the crimp configuration on the connective portion 25 of the reinforcement 2, as shown in FIG. 1, are formed. The reinforcement 2 is inserted into the transfer portion 15 of the cylindrical bellows tube 1 by pressure. These parts are connected via press forming from the outer side of the transfer portion 15, expanding the indentations 21 against the inner wall of the transfer portion 15 as shown in FIG. 2. Thus, the forming between the transfer portion 15 and the indentations 21 with the crimps is achieved by press forming 3, connecting both sides. In this way the bellows tube 1 and the reinforcement 2 are connected.

Figure 4:
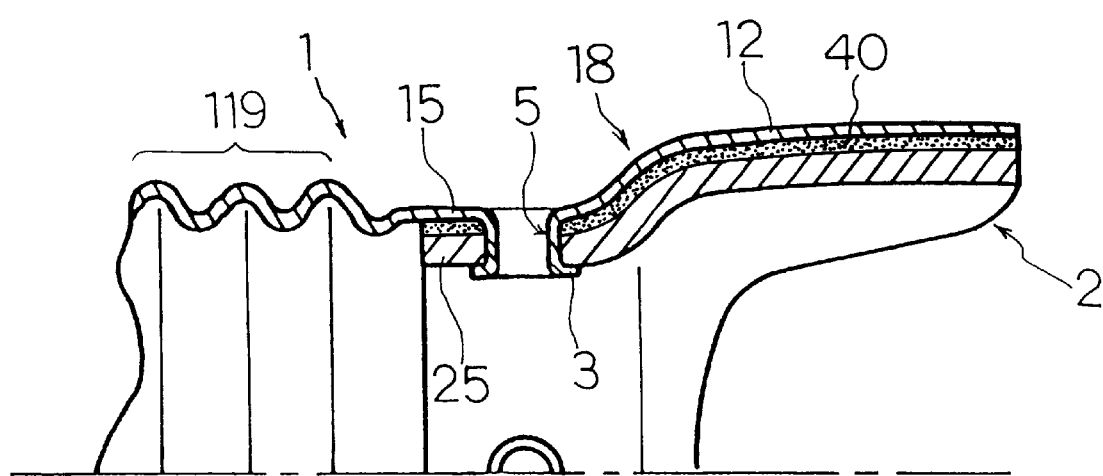
FIG. 4 is a partial longitudinal section of the steering column of FIG. 3 after the reinforcement 2 has been installed into the thin-walled tube 1 by press forming.

The method of connecting by press forming, and the method of stamp forming in addition to press forming are explained herein, and are shown in FIGS. 3 and 4. The holes 23 on the connective portion 25 of the reinforcement 2 are formed, and the holes 13 in the transfer portion 15 of the bellows tube 1 are formed to correspond to the holes 23. In such a construction, the connective portion 25 of the reinforcement 2 is inserted into the transfer portion of the bellows tube 1, aligning the holes 23 and the burring holes 13. The stamp forming 5 is performed when holes 13 of the transfer portion 15 of the bellows tube 1 coincide with the holes 23 as shown in FIG. 4. By this method the bellows tube 1 and the reinforcement 2 are connected, and their respective holes coincide. In the press forming method, the edge of the reinforcement 2 is formed by press forming 3 as shown in FIG. 4: in such a connection, the pressing method followed by the staking method is adopted. By this method, the bellows tube 1 and the reinforcement 2 are connected tightly.

Figure 5:
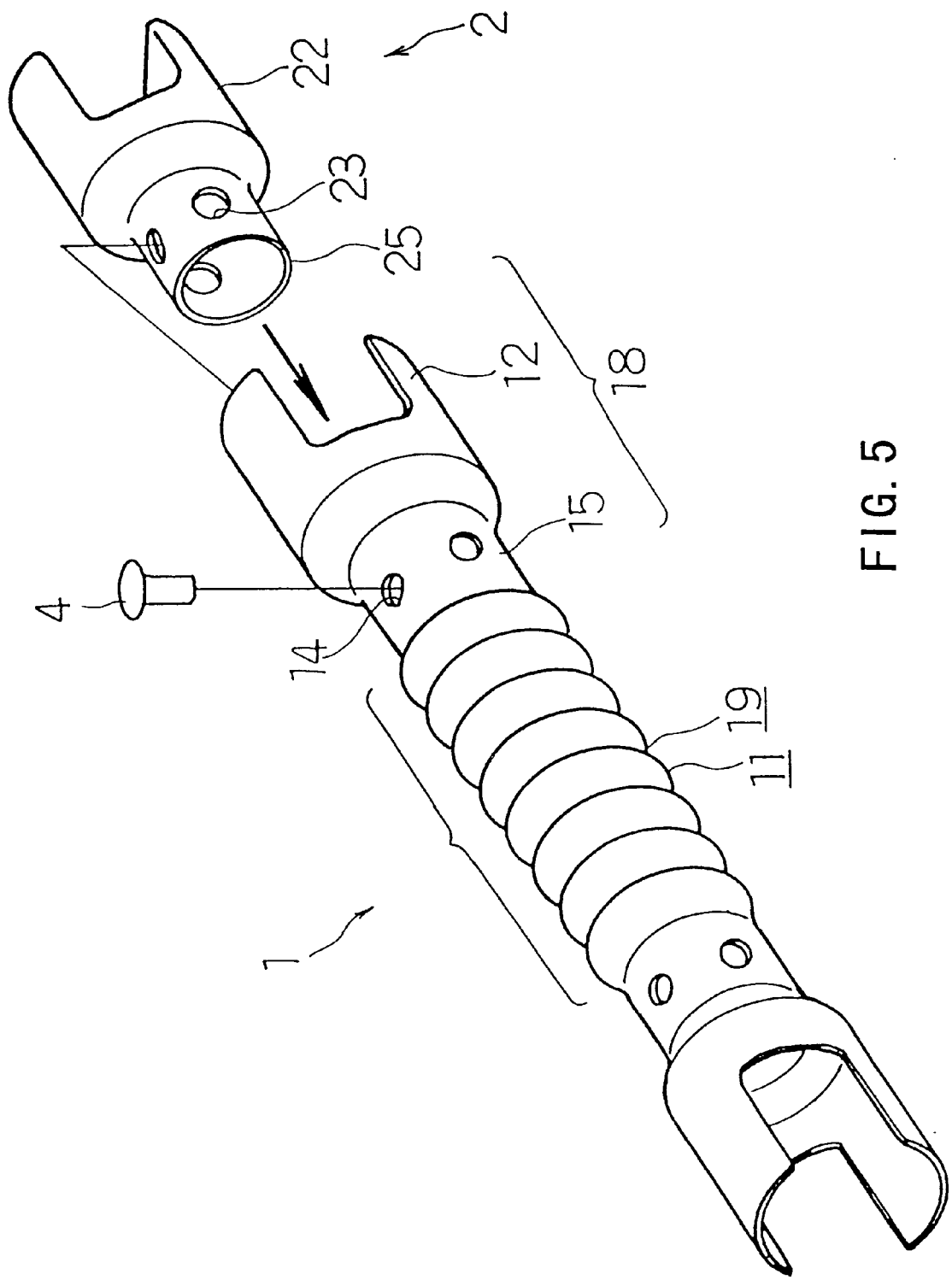
FIG. 5 is an oblique view showing the relationship between the corrugated tube and a reinforcement, which is the basic configuration of this invention.
Figure 7:
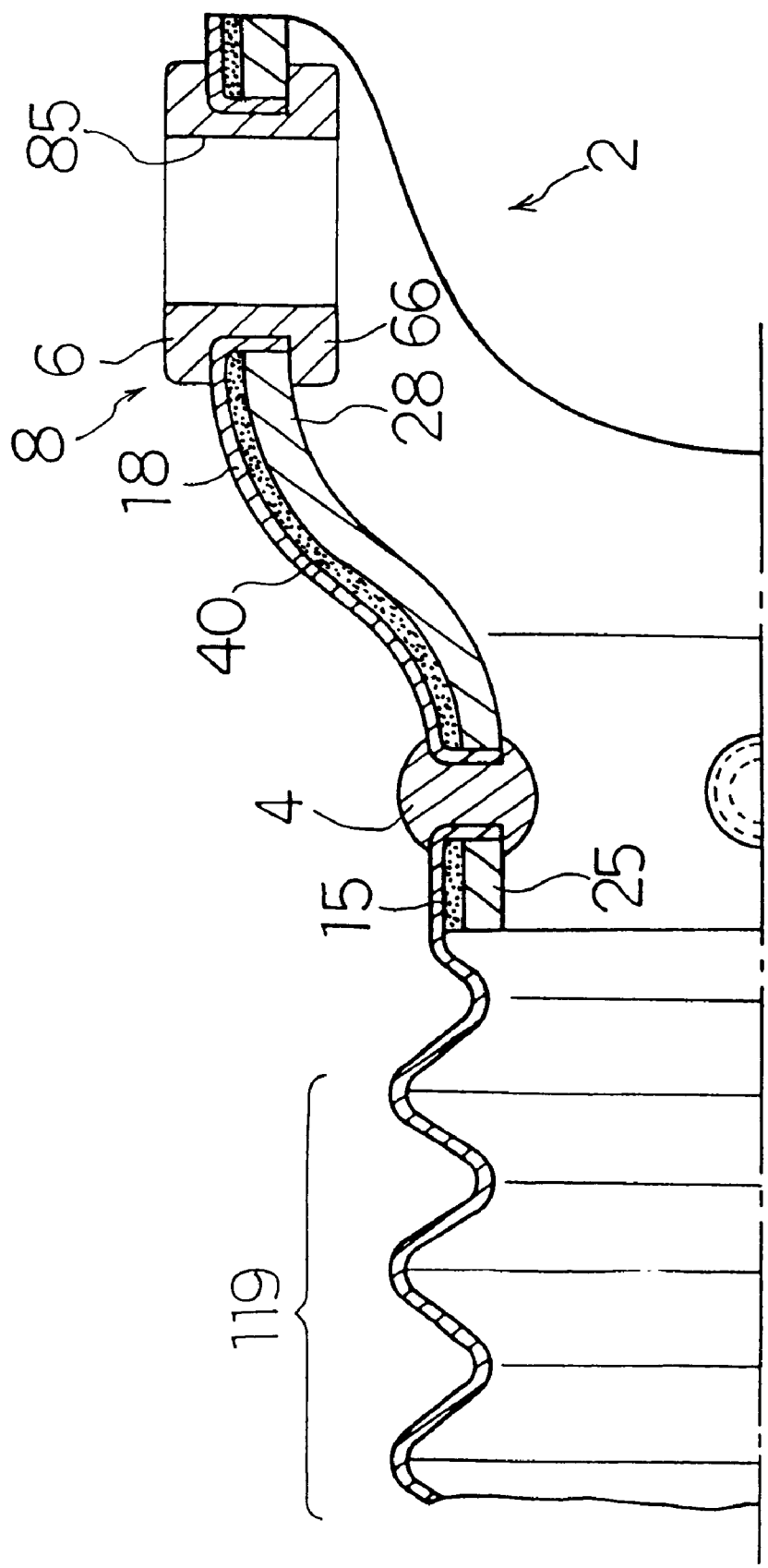
FIG. 7 is a partial section showing the liner installed to the spider bearing on the yoke.

The connection method of riveting is explained herein as shown in FIG. 5. The method is basically the same as the burring method: the holes in the connective portion 25 of reinforcement 2 are formed to correspond to the rivet holes in the transfer portion 15 of the bellows tube 1. The connective portion 25 of the reinforcement 2 is inserted into the transfer portion 15 of the bellows tube 1 using pressure, such that both sets of holes 14 and 23 align. In this position, as shown in FIG. 5, the rivet 4 is inserted and fixed in the rivet hole 14 and hole 23. By this method, bellows tube 1 and reinforcement 2 are connected integratively. As shown in FIG. 7, using only the rivet 4 is possible, or the riveting can be used in conjunction with the press and stamp forming as described above.

The method of connecting the bellows tube 1 and the reinforcement 2 by adhesives is explained herein. As shown in FIGS. 2, 4, and 6–8, some adhesives 40 are used between the outer side of the reinforcement 2 and the inner surfaces of the transfer portion 15 and the connective part 12 of bellows tube 1. The adhesive force connects the two parts tightly and enables them to work in unity. In this connection structure, the use of only adhesives, or the use of a combination or adhesives with press forming 3, and stamp forming 5, or riveting is considered.

Figure 6:
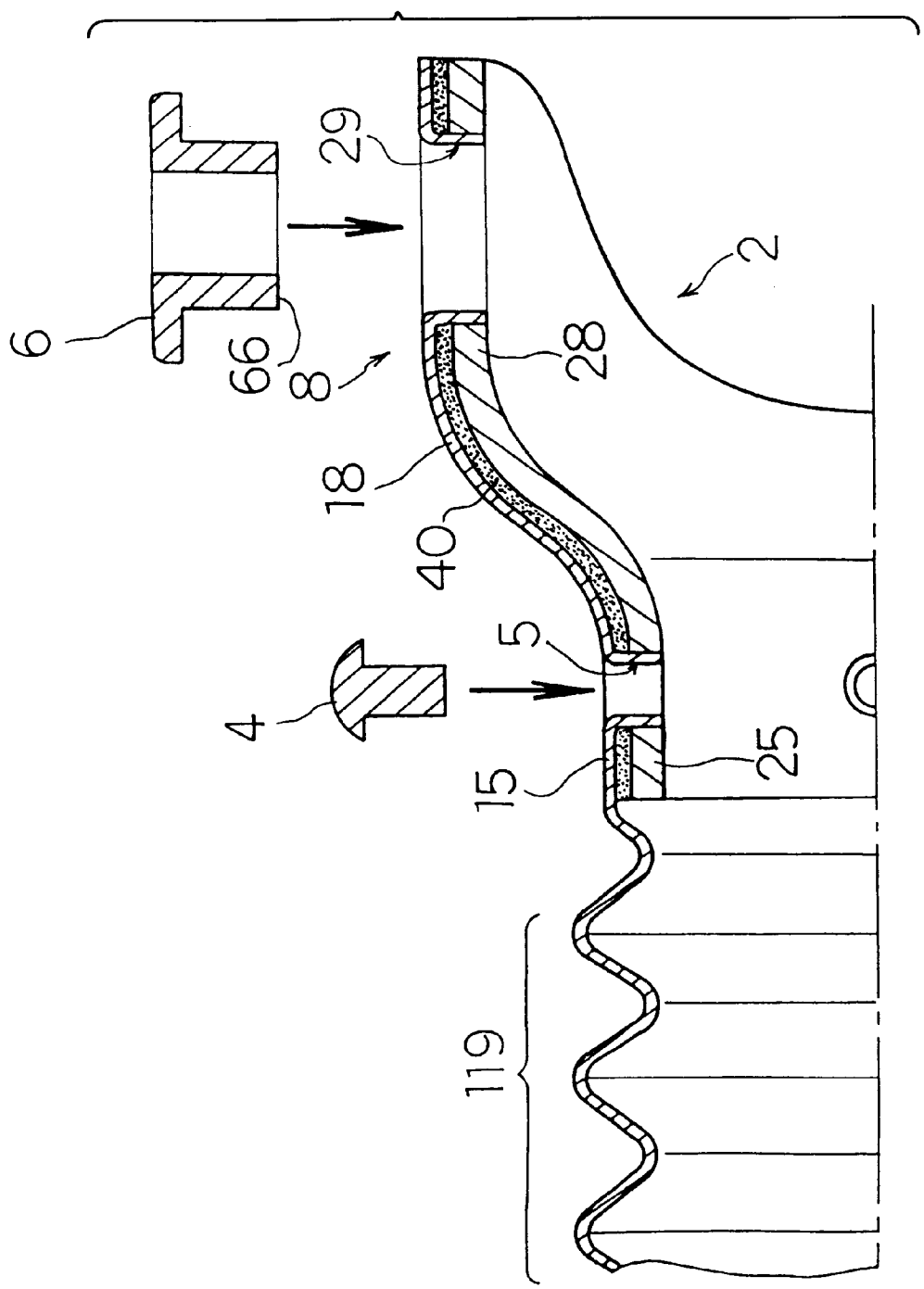
FIG. 6 is a partial longitudinal section of the steering column of FIG. 5 after the reinforcement 2 has been installed into the thin-walled tube 1 using a yoke and a liner, which is installed to the spider bearing of the yoke.
Figure 8:
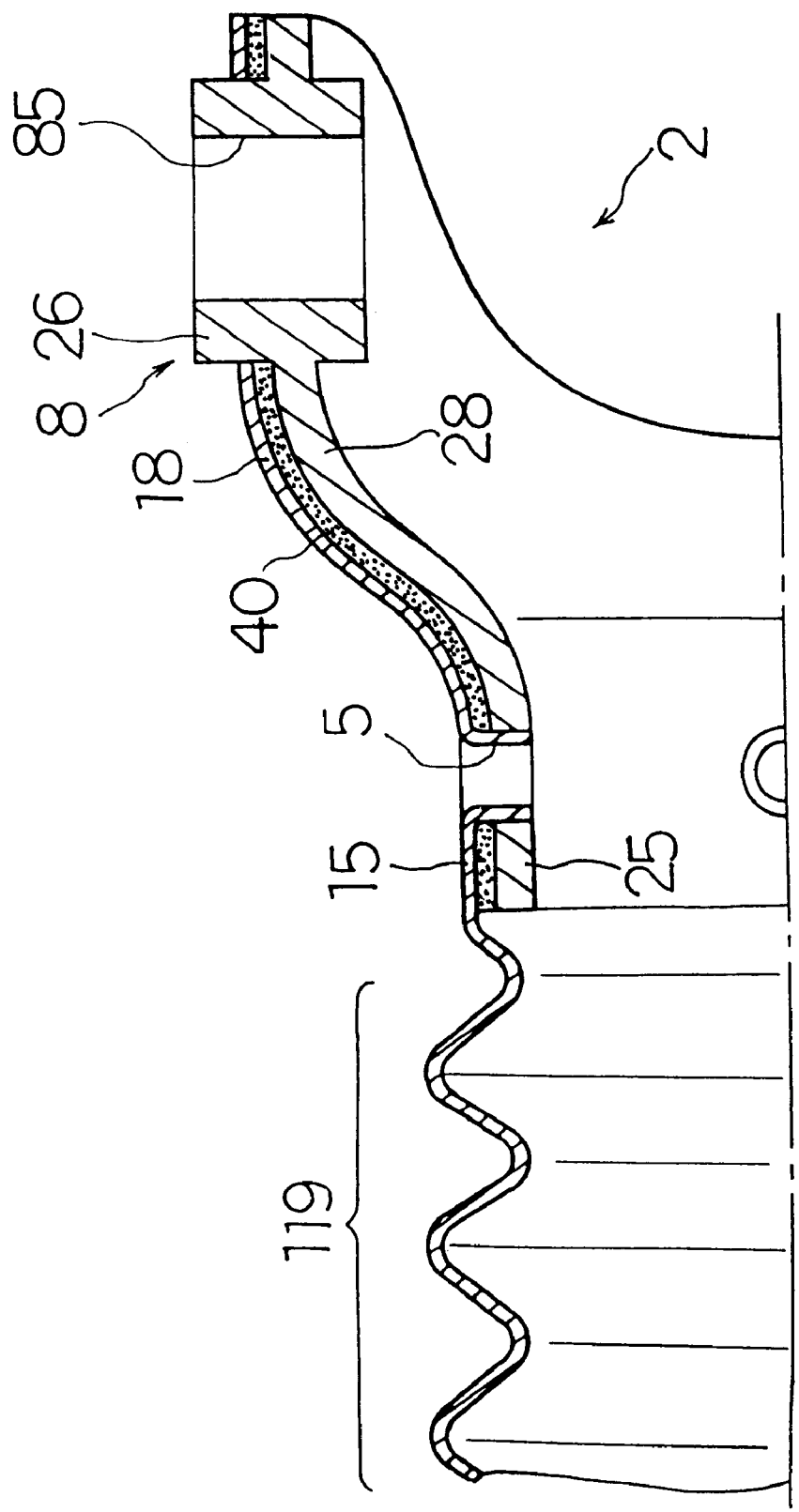
FIG. 8 is a longitudinal section showing the connection structure after the reinforcement has been installed using plastic forming to the liner of the yoke.

A method of connection between the reinforcement 2 and the yoke portion 8 of the bellows tube 1 is explained herein and shown in FIGS. 6 through 8. Instead of using the connection parts as in previously-described method on the transfer portion 15 and the connective portion 25, the reinforcement 2 and the end of the bellows tube 1 are connected by another method making use of forming a spider bearing 85 in the end of the yoke 8. Firstly, a structure equipping a liner 6 on the spider bearing 85 is explained, with reference to FIGS. 6 and 7. Setting holes 29 for installing the liner 6 are established on the end portion 18 of the bellows tube 1 and the yoke portion 28 of the reinforcement 2. The setting holes 29 for the liner 6 is made use of forming the spider bearing 85. In this condition, the end portion 66 of the liner 6 is then formed around the yoke part 28 of the reinforcement 2 using press forming or another type of forming. As a result, the liner 6 was formed plastically, and its final configuration of the liner is changed structurally to the liner 6 as shown in FIG. 7. By this method, the end portion 18 of the bellows 1 and the yoke portion 28 of the reinforcement 2 are tightly united, and the spider bearing 85 is formed simultaneously. For this structure, as possible connection methods between the end portion 18 of the bellows 1 and the yoke portion 28 of the reinforcement 2, these portions only are used. This connection method may, however, be used in conjunction with other methods such as press forming 3, stamp forming 5, rivet forming 4 or adhesives in the transfer part 15 and the connection portion 25 as shown in FIGS. 6 and 7.

Next, connecting structures by plastic forming such as flow drilling are explained as shown in FIG. 8. The method is essentially similar to the connection of the bellows tube 1 and the reinforcement 2 using the liner 6. The difference between the two methods is that, instead of the yoke portion 28 of the reinforcement 2 connecting with the end portion 18 of the bellows tube 1, the liner part 26 is set in the yoke portion 28 of the reinforcement 2 by the use of plastic forming such as flow drilling. In forming the liner part 26, the reinforcement 2, which includes the liner part 26, and the end portion 18 of the bellows tube 1 are connected. For this structure, possible connection methods are flow drilling, press forming 3, stamp forming 5, and riveting, combining the transfer portion 15 and the connective portion 25 as shown in FIG. 8.

Figure 9:
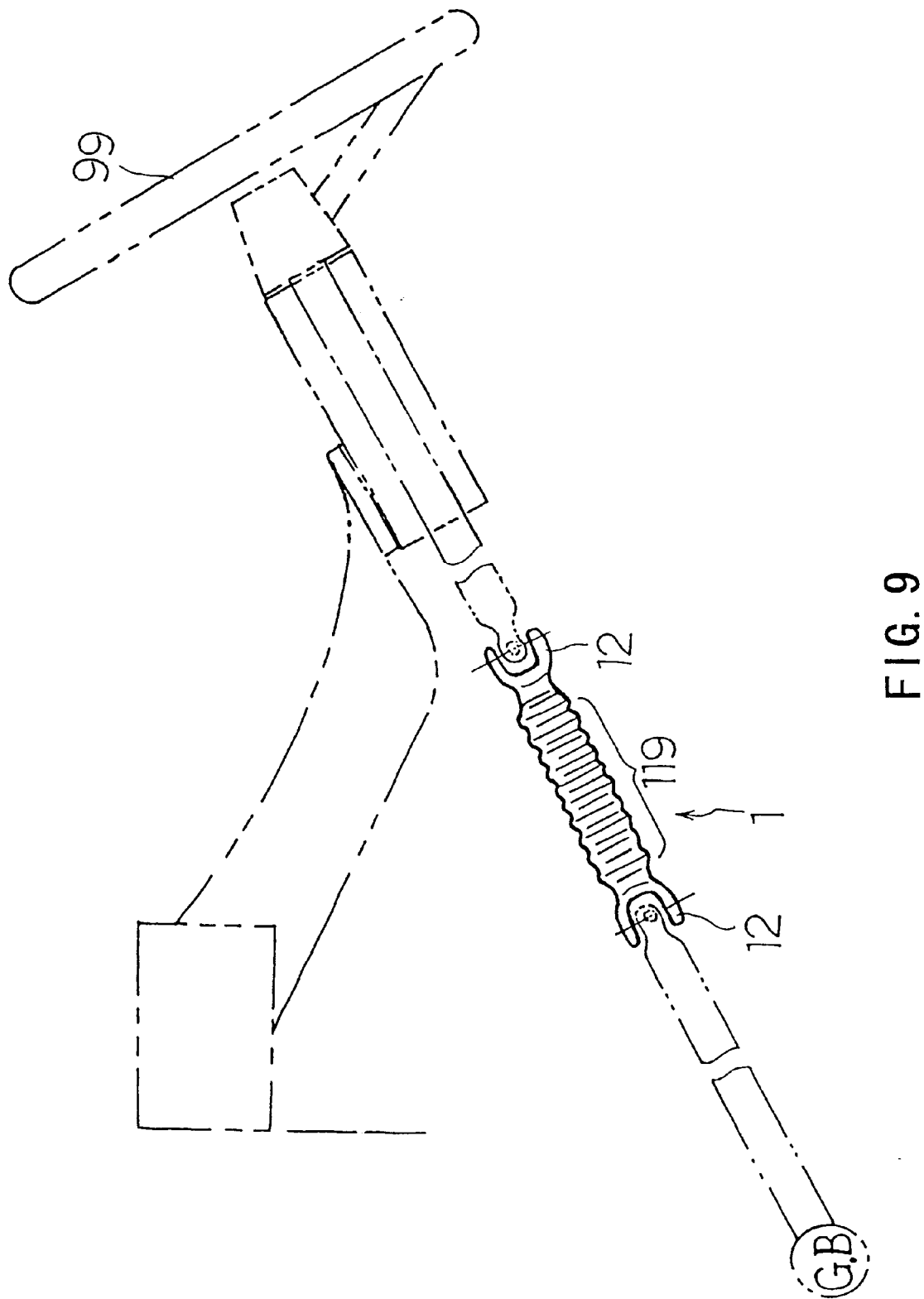
FIG. 9 is a schematic view of a collapsible steering shaft installed in a steering system.
Figure 10:
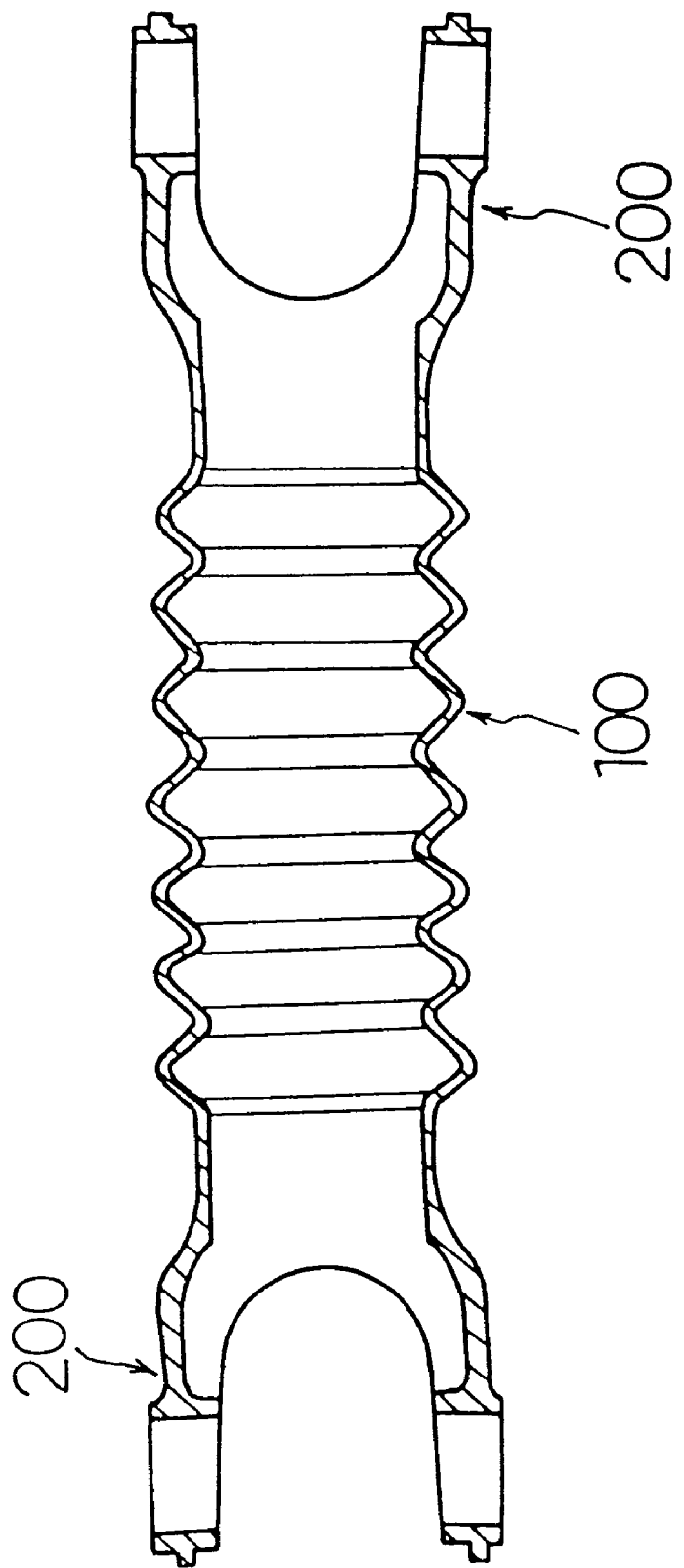
FIG. 10 is a longitudinal section of the structure of a corrugated tube which is formed of a single material, the corrugated portion and the ends of the tube which perform the connection function of the part being integrally formed.
Figure 11:
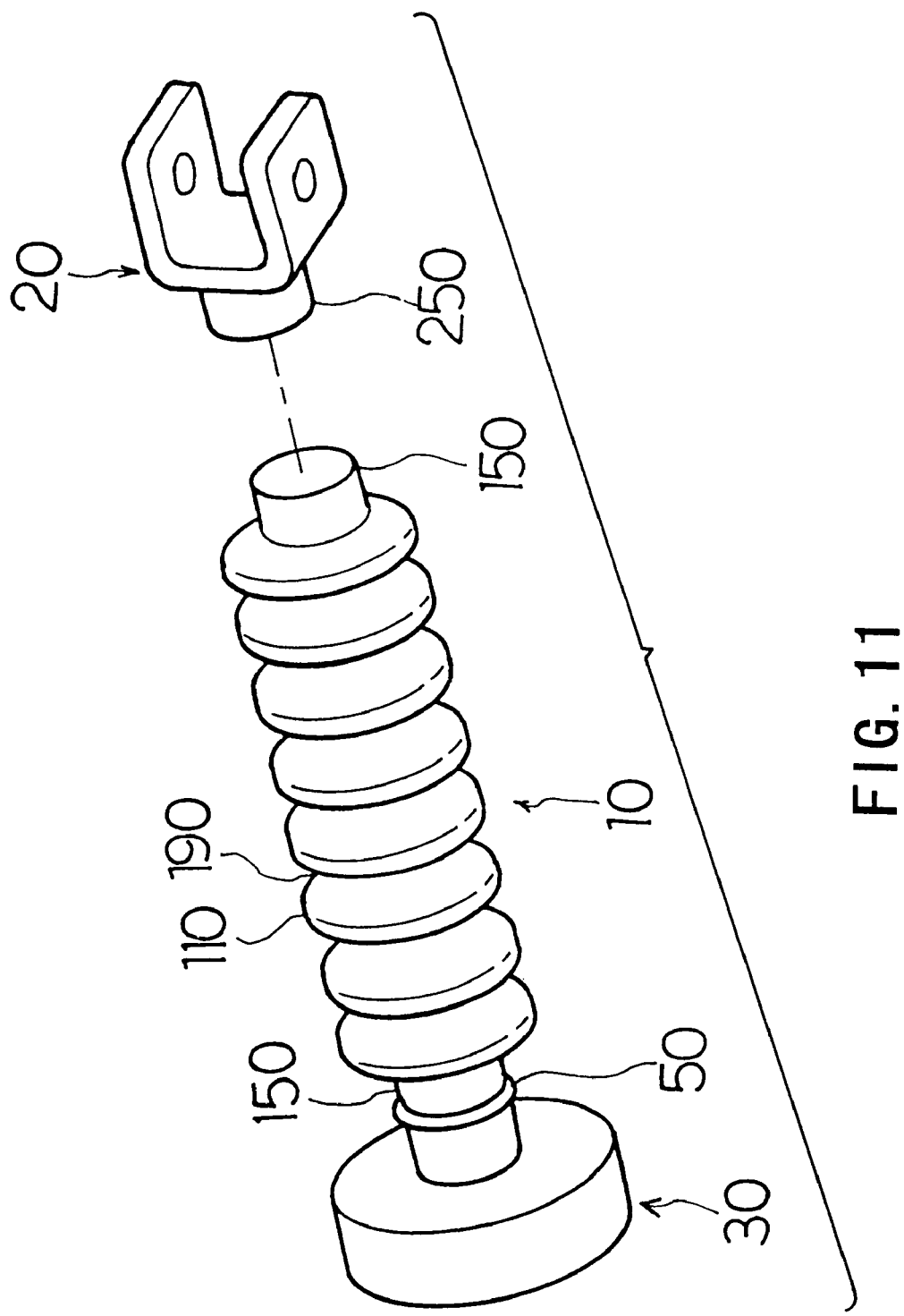
FIG. 11 is an oblique view showing a current steering column for a steering system.

Next, the function and effects of the invention consisting of these structures are explained. The collapsible steering column is located intermediately within the steering system as shown in FIG. 9. When an impact force is applied to the collapsible steering column from the steering wheel 99 or the gear box G.B., the collapsible steering shaft deforms axially or in bending. More specifically, the thin-walled corrugated portion 119 is deformed progressively by the impact force. By this plastic deformation, impact force (impact energy) from the steering wheel 99 or the gear box is absorbed efficiently.

Also, this invention embodies a reinforcement 2, with a relatively thicker wall, set into the ends of the bellows part 1. By this structure, the connection between the reinforcement 2 and the bellows tube 1 enhances strength and rigidity. Based upon the performance requirements of the corrugated portion 119 of the bellows tube, higher grade materials are used for the bellows tube 1. Lower-grade and less-expensive materials, however, can be used for the reinforcement 2. Accordingly, the total cost of materials is reduced.

In order to enhance the strength and rigidity, the thickness of the transfer and yoke portions generally must be increased. But in the design of this invention, the changes in strength and rigidity can be achieved by altering only the reinforcement 2. That is, a bellows tube 1 with a thicker wall or varying wall thickness is not necessary, nor is the use of higher-grade materials for the bellows tube 1. Thus, a reduction in the cost of materials is possible in this case.

Additionally, this invention yields enhanced efficiency in the work involved in connecting the bellows tube 1 and the reinforcement 2, by the use of press forming, stamp forming, rivet forming, or adhesive applied only to the connective portion of the bellows tube 1 or the reinforcement 2.

Also, the use of plastic forming or adhesives yields an additional advantage in that it eliminates the concern for strength reduction caused by second welding, which is a concern in current designs.

Another advantage is that with the use of the liner part 6 on the spider bearing part 85 as part of the yoke 8, both connection parts are combined as shown in FIG. 7. In this way, the connection between the reinforcement 2 and the bellows tube 1 is fixed more tightly. Accordingly, the strength and rigidity of the yoke part 8 increases. Furthermore, the connection between them using a plastic forming method such as flow drilling to the liner 26 of spider bearing 85 in yoke 8 is fixed more tightly as shown in FIG. 8. Namely, in flow drilling forming the liner 26 is more tightly contacting part of the reinforcement 2, the connection between the reinforcement 2 and the end portion 18 of the bellows tube 1 is performed concurrently, and is more efficient and tight.

What is claimed is:

1. A collapsible steering shaft for installation in a vehicle steering system, said collapsible steering shaft comprising:
a bellows tube including a corrugated portion of regularly varying radius, with a maximum and minimum radius, forming convolutions along the length of said corrugated portion, transfer portions having a constant radius and extending axially from opposite ends of said corrugated portion, and connecting yoke portions, one extending axially from each of said transfer portions, for connecting opposed ends of said bellows tube to adjoining components within the steering system, each of said connecting yoke portions including diametrically-opposed, axially-extending segments,
wherein, said corrugated portion, said transfer portions, and said connecting yoke portions are integrally formed with one another from a single piece of material;
reinforcements formed into both ends of said bellows tube, each having a first connective portion and a second connective portion defining a yoke configuration with diametrically-opposed, axially-extending segments, said reinforcements being constructed and arranged to conform to the opposed ends of said bellows tube with said first connective portion conforming to said transfer portion and said second connective portion conforming to said connecting yoke portion of said bellows tube to reinforce said connecting yoke portions; and
means for connecting said reinforcements to both ends of said bellows tube comprising a one of press forming, stamp forming, rivet forming, and adhesives.

2. A collapsible steering shaft for installation in a vehicle steering system, said collapsible steering shaft comprising:
a bellows tube including a corrugated portion of regularly varying radius, with a maximum and minimum radius, forming convolutions along the length of said corrugated portion, transfer portions having a constant radius and extending axially from opposite ends of said corrugated portion, and connecting yoke portions, one extending axially from each of said transfer portions, which connect to adjoining parts of the steering system, said connecting yoke portions each having diametrically-opposed, axially-extending segments with a spider bearing formed in each of said segments,
wherein, said corrugated portion, said transfer portions, and said connecting yoke portions are integrally formed with one another from a single piece of material;
reinforcements formed into both ends of said bellows tube, each having a first connective portion and a second connective portion defining a yoke configuration with diametrically-opposed, axially-extending segments, said reinforcements being constructed and arranged to conform to opposed ends of said bellows tube with said first connective portion conforming to said transfer portion and said second connective portion conforming to said connecting yoke portion of said bellows tube to reinforce said connecting yoke portions of said bellows tube; and
means for connecting each connecting yoke portion of said bellows tube and said reinforcement including a liner having a through-hole formed therein, an inner surface of the through-hole defining said spider bearing of said connecting yoke portion.

3. A collapsible steering shaft for installation in a vehicle steering system, said collapsible steering shaft comprising:
a bellows tube including a corrugated portion of regularly varying radius, with a maximum and minimum radius, forming convolutions along the length of the corrugated portion, transfer portions having a constant radius and extending axially from opposite ends of said corrugated portion, and connecting yoke portions, one extending axially from each of said transfer portions, which connect to adjoining parts of the steering system, said connecting yoke portions each having diametrically-opposed, axially-extending segments with a spider bearing formed in each of said segments, wherein, said corrugated portion, said transfer portions, and said connecting yoke portions are integrally formed with one another from a single piece of material;

reinforcements formed into both ends of the bellows tube, each having a first connective portion and a second connective portion defining a yoke configuration with diametrically-opposed, axially-extending segments, said reinforcements being constructed and arranged to conform to opposed ends of said bellows tube with said first connective portion conforming to said transfer portion and said second connective portion conforming to said connecting yoke portion of said bellows tube to reinforce the connecting yoke portions of the bellows tube; and means for connecting each connecting yoke portion of the bellows tube and the reinforcement including a liner formed by flow drilling on the spider bearing of the connecting yoke portion.

4. A collapsible steering shaft for installation in a vehicle steering system, said collapsible steering shaft comprising:

a bellows tube including a corrugated portion of regularly varying radius, with a maximum and minimum radius, forming convolutions along the length of the corrugated portion, transfer portions having a constant radius and extending axially from opposite ends of said corrugated portion, and connecting yoke portions, one extending axially from each of said transfer portions, which connect to adjoining parts of the steering system, said connecting yoke portions each having diametrically-opposed, axially-extending segments with a spider bearing formed in each of said segments, wherein said corrugated portion, said transfer portions, and said connecting yoke portions are integrally formed with one another from a single piece of material;

reinforcements formed into both ends of the bellows tube, each having a first connective portion and a second connective portion defining a yoke configuration with diametrically-opposed, axially-extending segments, said reinforcements being constructed and arranged to conform to opposed ends of said bellows tube with said first connective portion conforming to said transfer portion and said second connective portion conforming to said connecting yoke portion of said bellows tube to reinforce the connecting yoke portions of the bellows tube; and means for connecting each connecting yoke portion of the bellows tube and the reinforcement including one of an adhesive between the connecting yoke portion and the reinforcement, and a rivet extending through the transfer portion and said first connective portion of the reinforcement.

5. A collapsible steering shaft for installation in a vehicle steering system, said collapsible steering shaft comprising:

a bellows tube including a corrugated portion of regularly varying radius, with a maximum and minimum radius, forming convolutions along the length of the corrugated portion, transfer portions having a constant radius and extending axially from opposite ends of said corrugated portion, and connecting yoke portions, one extending axially from each of said transfer portions, which connect to adjoining parts of the steering system, said connecting yoke portions each including diametrically-opposed, axially-extending segments with a spider bearing formed in each of said segments, wherein said corrugated portion, said transfer portions, and said connecting yoke portions are integrally formed with one another from a single piece of material;

reinforcements formed into both ends of the bellows tube, each having a first connective portion and a second connective portion defining a yoke configuration with diametrically-opposed, axially-extending segments, said reinforcements being constructed and arranged to conform to opposed ends of said bellows tube with said first connective portion conforming to said transfer portion and said second connective portion conforming to said connecting yoke portion of said bellows tube to reinforce the connecting yoke portions of the bellows tube; and means for connecting each connecting yoke portion of the bellows tube and the reinforcement including (1) one of an adhesive between the connecting yoke portion and the reinforcement, and a rivet extending through the transfer portion and said first connective portion of the reinforcement on one end of the bellows tube, and (2) one of an adhesive between the connecting yoke portion and the reinforcement, and a rivet extending through the transfer portion and said first connective portion of the reinforcement at another end of the bellows tube.

6. A collapsible steering shaft for installation in a vehicle steering system, said collapsible steering shaft comprising:

a bellows tube including a corrugated portion having a plurality of convolutions of varying radius formed along a length thereof, transfer portions having a constant radius and extending axially from opposite ends of said corrugated portion, and connecting yoke portions, one extending axially from each of said transfer portions, for connecting ends of the bellows tube to adjoining components within the steering system, each of said connecting yoke portions including diametrically-opposed, axially-extending segments, wherein, said corrugated portion, said transfer portions, and said connecting yoke portions are integrally formed with one another from a single piece of material; and connecting reinforcements coupled with opposed ends of the bellows tube, each having a first connective portion and a second connective portion defining a yoke configuration with diametrically-opposed, axially-extending segments, said connecting reinforcements being constructed and arranged to conform to the opposed ends of said bellows tube with said first connective portion conforming to said transfer portion and said second connective portion conforming to said connecting yoke portion of said bellows tube to reinforce said connecting yoke portions.

* * * * *